(12) United States Patent
Krivenok

(10) Patent No.: US 11,902,163 B2
(45) Date of Patent: Feb. 13, 2024

(54) SYSTEM AND METHOD FOR LACP ENHANCEMENTS

(71) Applicant: EMC IP Holding Company, LLC, Hopkinton, MA (US)

(72) Inventor: Dmitry V. Krivenok, St. Petersburg (RU)

(73) Assignee: EMC IP Holding Company, LLC, Hopkinton, MA (US)

( * ) Notice: Subject to any disclaimer, the term of this patent is extended or adjusted under 35 U.S.C. 154(b) by 245 days.

(21) Appl. No.: 17/318,472

(22) Filed: May 12, 2021

(65) Prior Publication Data

US 2021/0367890 A1 Nov. 25, 2021

(30) Foreign Application Priority Data

May 19, 2020 (RU) .................................. 2020116377

(51) Int. Cl.
*H04L 29/12* (2006.01)
*H04L 47/122* (2022.01)
*H04L 47/2416* (2022.01)
*H04L 47/10* (2022.01)
*H04L 101/622* (2022.01)

(52) U.S. Cl.
CPC ............ *H04L 47/122* (2013.01); *H04L 47/15* (2013.01); *H04L 47/2416* (2013.01); *H04L 2101/622* (2022.05)

(58) Field of Classification Search
CPC . H04L 2101/622; H04L 47/122; H04L 47/15; H04L 47/2416
USPC ......................................................... 370/329
See application file for complete search history.

(56) References Cited

U.S. PATENT DOCUMENTS

| | | | |
|---|---|---|---|
| 9,628,374 B1* | 4/2017 | Devilbiss ................ H04L 47/41 |
| 11,171,834 B1* | 11/2021 | Bockelmann ....... G06F 9/44505 |
| 2015/0215207 A1* | 7/2015 | Qin ...................... H04L 12/4625 |
| | | | 370/392 |
| 2018/0176036 A1* | 6/2018 | Butcher .................. H04L 67/10 |
| 2022/0027310 A1* | 1/2022 | Singhal ................. G06F 3/0605 |
| 2022/0052904 A1* | 2/2022 | Howard ................. H04L 47/41 |

* cited by examiner

*Primary Examiner* — Robert J Lopata
(74) *Attorney, Agent, or Firm* — Brian J. Colandreo; Heath M. Sargeant; Holland & Knight LLP

(57) ABSTRACT

A method, computer program product, and computer system for splitting, by a computing device, a plurality of physical Ethernet ports into at least two logical devices, wherein the at least two logical devices may have different media access control (MAC) addresses. A first device of the at least two logical devices may be used in an independent mode. A second device of the at least two logical devices may be used as a slave interface. A selective bypass schema may be executed for traffic on the plurality of physical Ethernet ports.

20 Claims, 16 Drawing Sheets

SYSTEM AND METHOD FOR LACP ENHANCEMENTS

RELATED APPLICATION

The subject application claims the priority of Russia Patent Application No. 2020116377, filed on 19 May 2020, the contents of which are herein incorporated by reference in its entirety.

BACKGROUND

Modern enterprise storage systems may support many different protocols and storage workloads. Those workloads may include block access via iSCSI and Non-Volatile-Memory-Express over Fabrics (NVMe-oF), file access via server message block (SMB) and network file system (NFS), replication via block or native protocols, object access via protocols like S3 and Swift and many others. Some storage systems are clustered or federated systems which means that other types of inter-node traffic exist, for example cluster management traffic and internal data mobility traffic.

BRIEF SUMMARY OF DISCLOSURE

In one example implementation, a method, performed by one or more computing devices, may include but is not limited to splitting, by a computing device, a plurality of physical Ethernet ports into at least two logical devices, wherein the at least two logical devices may have different media access control (MAC) addresses. A first device of the at least two logical devices may be used in an independent mode. A second device of the at least two logical devices may be used as a slave interface. A selective bypass schema may be executed for traffic on the plurality of physical Ethernet ports.

One or more of the following example features may be included. The traffic may be unicast. The traffic may be multicast. The splitting may be performed in a software-only design in one or more network interface cards. The splitting may be performed in hardware using a driver of one or more network interface cards. One or more filters may be synchronized between the at least two logical devices. One or more filters may be synchronized between the plurality of physical Ethernet ports.

In another example implementation, a computing system may include one or more processors and one or more memories configured to perform operations that may include but are not limited to splitting a plurality of physical Ethernet ports into at least two logical devices, wherein the at least two logical devices may have different media access control (MAC) addresses. A first device of the at least two logical devices may be used in an independent mode. A second device of the at least two logical devices may be used as a slave interface. A selective bypass schema may be executed for traffic on the plurality of physical Ethernet ports.

One or more of the following example features may be included. The traffic may be unicast. The traffic may be multicast. The splitting may be performed in a software-only design in one or more network interface cards. The splitting may be performed in hardware using a driver of one or more network interface cards. One or more filters may be synchronized between the at least two logical devices. One or more filters may be synchronized between the plurality of physical Ethernet ports.

In another example implementation, a computer program product may reside on a computer readable storage medium having a plurality of instructions stored thereon which, when executed across one or more processors, may cause at least a portion of the one or more processors to perform operations that may include but are not limited to splitting a plurality of physical Ethernet ports into at least two logical devices, wherein the at least two logical devices may have different media access control (MAC) addresses. A first device of the at least two logical devices may be used in an independent mode. A second device of the at least two logical devices may be used as a slave interface. A selective bypass schema may be executed for traffic on the plurality of physical Ethernet ports.

One or more of the following example features may be included. The traffic may be unicast. The traffic may be multicast. The splitting may be performed in a software-only design in one or more network interface cards. The splitting may be performed in hardware using a driver of one or more network interface cards. One or more filters may be synchronized between the at least two logical devices. One or more filters may be synchronized between the plurality of physical Ethernet ports.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
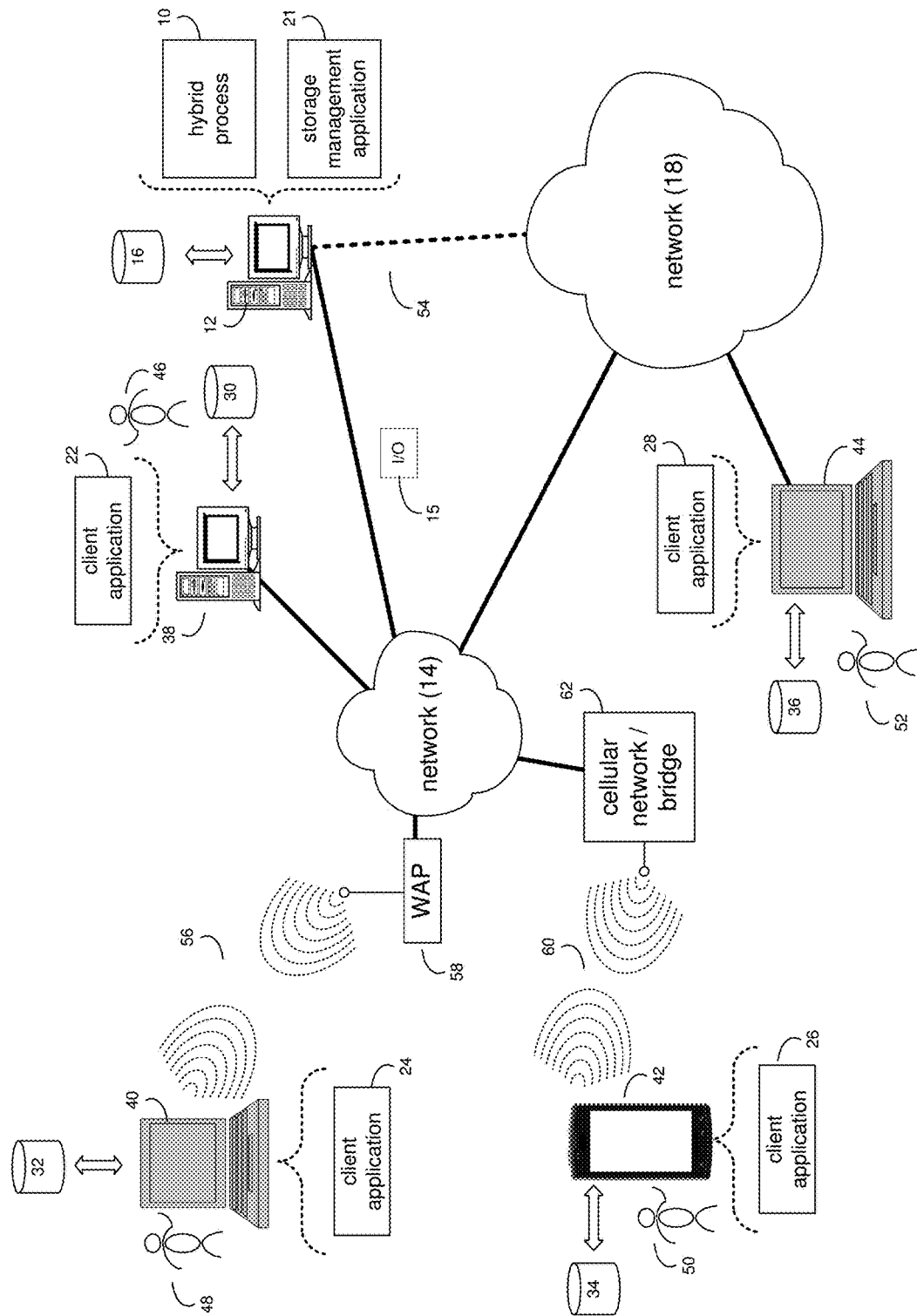
FIG. 1 is an example diagrammatic view of a hybrid process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown hybrid process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a hybrid process, such as hybrid process 10 of FIG. 1, may split, by a computing device, a plurality of physical Ethernet ports into at least two logical devices, wherein the at least two logical devices may have different media access control (MAC) addresses. A first device of the at least two logical devices may be used in an independent mode. A second device of the at least two logical devices may be used as a slave interface. A selective bypass schema may be executed for traffic on the plurality of physical Ethernet ports.

In some implementations, the instruction sets and subroutines of hybrid process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, hybrid process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, hybrid process 10 and/or storage management application 21 may be accessed via one or more of client applications 22, 24, 26, 28. In some implementations, hybrid process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within hybrid process 10, a component of hybrid process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of hybrid process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of hybrid process 10 (and vice versa). Accordingly, in some implementations, hybrid process 10 may be a purely server-side application, a purely client-side application, or a hybrid server-side/client-side application that is cooperatively executed by one or more of client applications 22, 24, 26, 28 and/or hybrid process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, hybrid process 10, and storage management application 21, taken singly or in any combination, may effectuate some or all of the same functionality, any description of effectuating such functionality via one or more of client applications 22, 24, 26, 28, hybrid process 10, storage management application 21, or combination thereof, and any described interaction(s) between one or more of client applications 22, 24, 26, 28, hybrid process 10, storage management application 21, or combination thereof to effectuate such functionality, should be taken as an example only and not to limit the scope of the disclosure.

In some implementations, one or more of users 46, 48, 50, 52 may access computer 12 and hybrid process 10 (e.g., using one or more of client electronic devices 38, 40, 42, 44) directly through network 14 or through secondary network 18. Further, computer 12 may be connected to network 14 through secondary network 18, as illustrated with phantom link line 54. Hybrid process 10 may include one or more user interfaces, such as browsers and textual or graphical user interfaces, through which users 46, 48, 50, 52 may access hybrid process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24,

26, 28 to, e.g., computer 12. Examples of I/O request 15 may include but are not limited to, data write requests (e.g., a request that content be written to computer 12) and data read requests (e.g., a request that content be read from computer 12).

Figure 2:
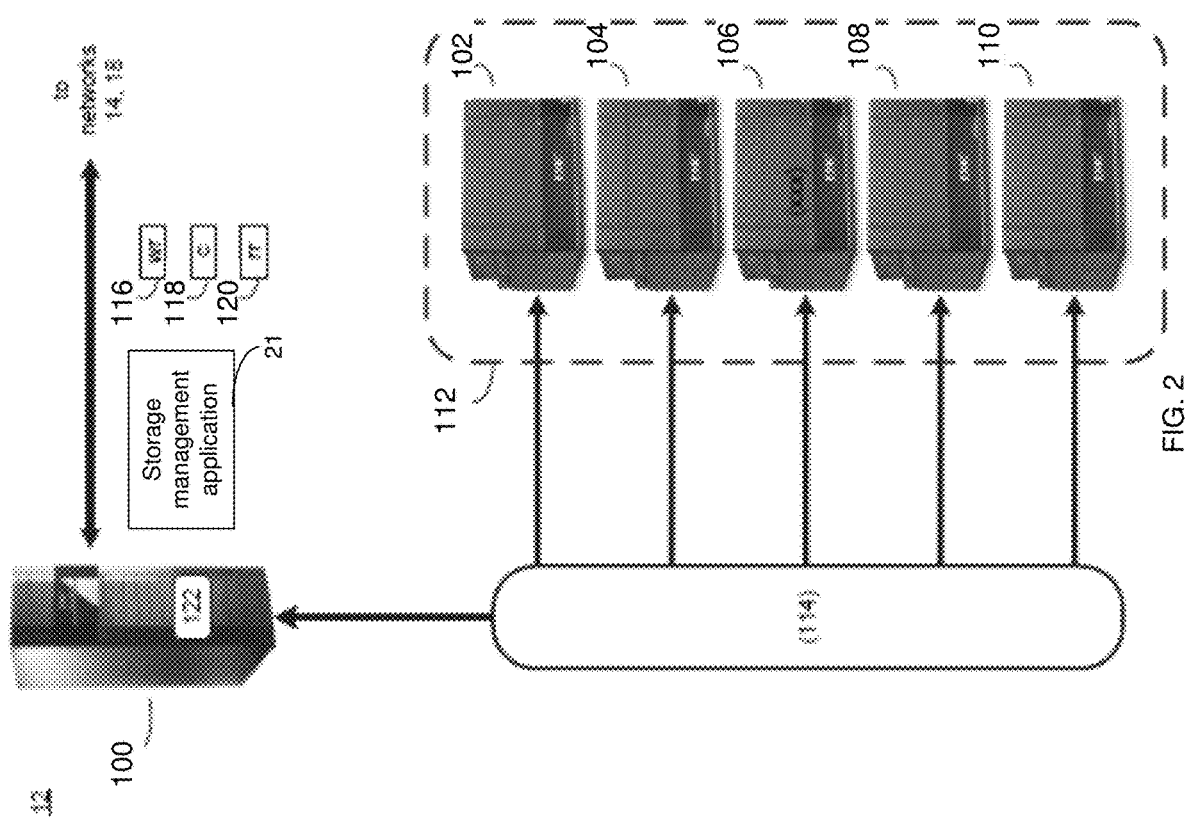
FIG. 2 is an example diagrammatic view of a storage system of FIG. 1 according to one or more example implementations of the disclosure.
Figure 3:
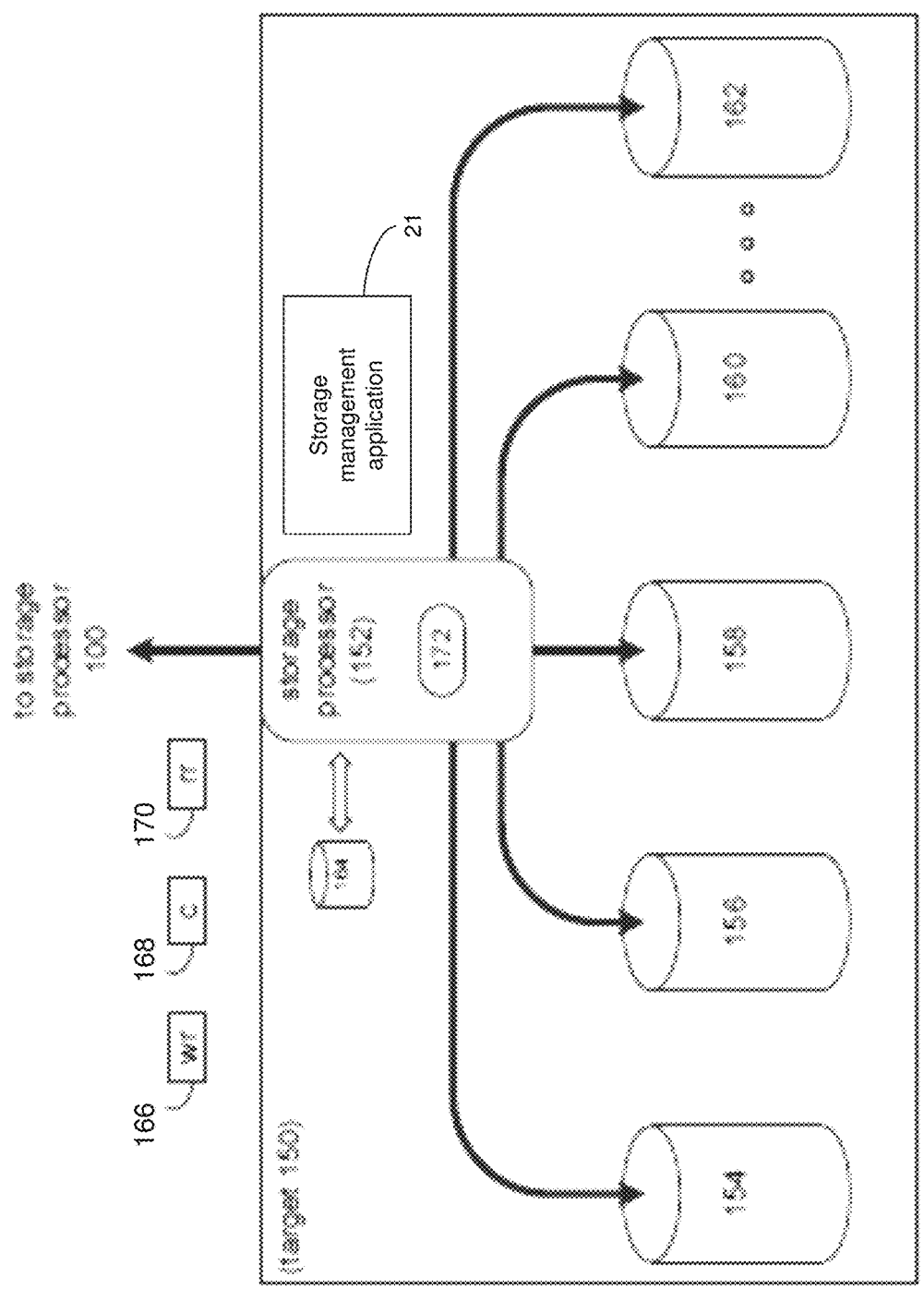
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, or Unity™ system offered by Dell EMC™ of Hopkinton, MA.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or hybrid process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, or Unity™ system offered by Dell EMC™ of Hopkinton, MA. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

As noted above, modern enterprise storage systems may support many different protocols and storage workloads. Those workloads may include block access via iSCSI and Non-Volatile-Memory-Express over Fabrics (NVMe-oF), file access via server message block (SMB) and network file system (NFS), replication via block or native protocols, object access via protocols like S3 and Swift and many others. Some storage systems are clustered or federated systems which means that other types of inter-node traffic exist, for example cluster management traffic and internal data mobility traffic.

Some protocols may natively support multi-pathing which makes it possible to utilize the network bandwidth of all ports and support high-availability in case of port, cable or switch failures. Other protocols, however, either may not have native multi-pathing support at all or such support may not be implemented in the storage stack. In such scenarios, network-level high-availability mechanisms are used. One example of such mechanisms is link aggregation via industry standard Link Aggregation Control Protocol (LACP). Even though LACP based link aggregation may solve the high availability problem, it may have some issues in storage related use-cases. For example, LACP may require explicit configuration on the physical switches and in case of dual-switch deployments, may require some form of inter-chassis link (ICL) (e.g., Dell VLTi, Cisco vPC, Arista MLAG, etc.). Failure to configure the LACP on the switch side may lead to reduced network bandwidth. Even though LACP and ICL configurations a relatively straightforward process on all modern network OS's, many storage administrators without networking background may find it difficult to do and consider this as a storage system deployment burden.

As another example, distribution of traffic among the ports in a LACP port channel is done via applying a hash function to the fields in the Ethernet frame and storage systems generally cannot control distribution of incoming traffic because the physical switch has its own, independent hash function. In some cases, when the number of network flows is relatively low, the hash function may always select the same port thus overloading it. This port becomes a bottleneck and the storage system has no mechanism to solve this problem.

As yet another example, when ports are aggregated into LACP LAG, this aggregation may affect all protocols, including those with native multi-pathing support. MPIO software is no longer able to control the selection of a specific port because it sees a single aggregated port. It is not known to be possible to simultaneously leverage LACP LAG for one set of protocols and still treat the ports as independent for another set of protocols.

As yet another example, remote direct memory access (RDMA) based protocols like NVMe/ROCEv2 require support of functionality like ROCE LAG which must be supported by the hardware, firmware and the OS driver. Modern RNICs have lots of limitations concerning the configuration of ROCE LAG due to internal limitations of RNIC hardware. If a valid LACP LAG does not satisfy those requirements, then ROCE-based protocols may not work because ROCE LAG cannot be created.

As yet another example, some unified storage systems do not have enough physical ports to exclusively assign some ports to one set of protocols and other ports to another set of protocols (e.g., if the storage node has only two high-bandwidth data ports which have to be shared between protocols). In case such system supports protocols without native multi-pathing support, the only way to achieve the high availability may be via link-aggregation at the network level.

Existing storage systems may use the dedicated physical ports for different protocols. This is a simple and usually reliable approach. The downside of this approach is that it may require storage nodes to have many physical ports, requires additional SFPs and cables, additional ports on the physical switches and hence extra cost (both CAPEX and OPEX). The storage system initial deployment may be more complicated due to the need to plug more cables, configure more switch ports, etc.

Existing storage systems may also not use LACP LAGs and instead implement proprietary high availability (HA) mechanisms on top of independent physical ports. This approach allows the storage system to take advantage of native multi-pathing provided by some protocols and does not require LACP on the switch side. However, the protocols without native multi-pathing support usually get only a fraction of the available bandwidth due to active/passive nature of such HA schemes. Also, the only practical example of such implementations may have additional restrictions on the network topology. Specifically, the independent ports generally must use 802.1q tagged frames which is not always feasible.

Figure 4:
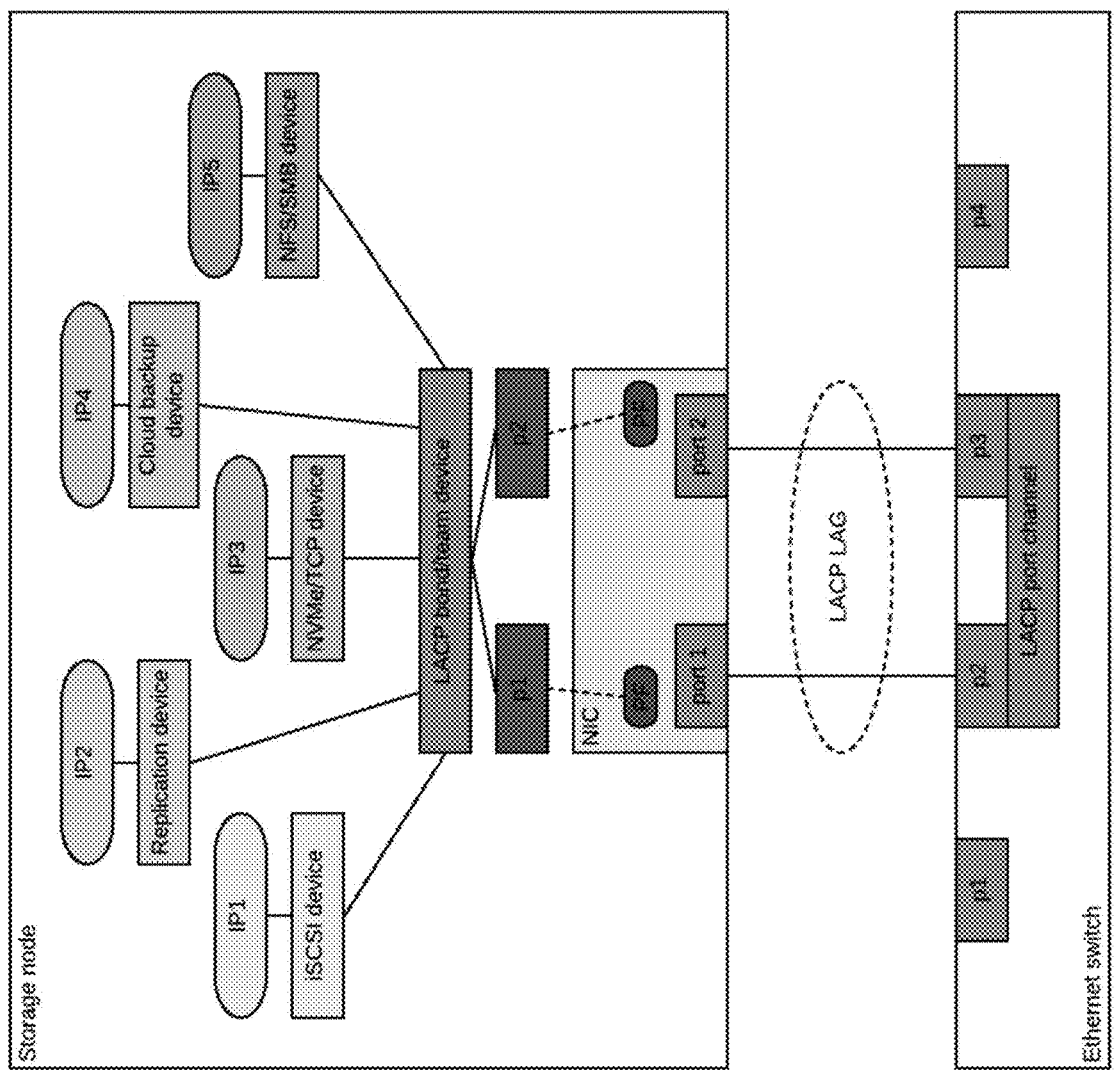
FIG. 4 is an example diagrammatic view of an organization of a storage controller node according to one or more example implementations of the disclosure.

Existing storage systems may also rely on other approaches by relying on LACP and have the disadvantages above. LACP provides a method to control the bundling of several physical ports together to form a single logical channel. LACP allows a network device to negotiate an automatic bundling of links by sending LACP packets to the peer (directly-connected device that also implements LACP) link aggregation applies to various methods of combining (aggregating) multiple network connections in parallel in order to increase throughput beyond what a single connection could sustain, and to provide redundancy in case one of the links should fail. Referring to FIG. 4, there is shown an example of one possible organization of a storage controller node 400 that has multiple traffic types configured over the LACP bond virtual interface. In this example, LACP bond is configured on top of two physical Ethernet ports, but LACP supports aggregation of more ports if required. LACP is usually implemented as virtual network device provided by OS kernel on the host side and as virtual port-channel interface on the Ethernet switch side. In the example, multiple types of traffic are configured on top of the bond interface. The configuration of virtual network devices and the number of traffic types is storage system specific.

Some protocols like iSCSI and NVMe/TCP may support native multi-pathing, but generally cannot operate directly on the slave ports of the LACP bond device in such configuration. Other protocols such as NAS often do not have multi-pathing support and require network HA provided by the bond like shown in this example.

Figure 5:
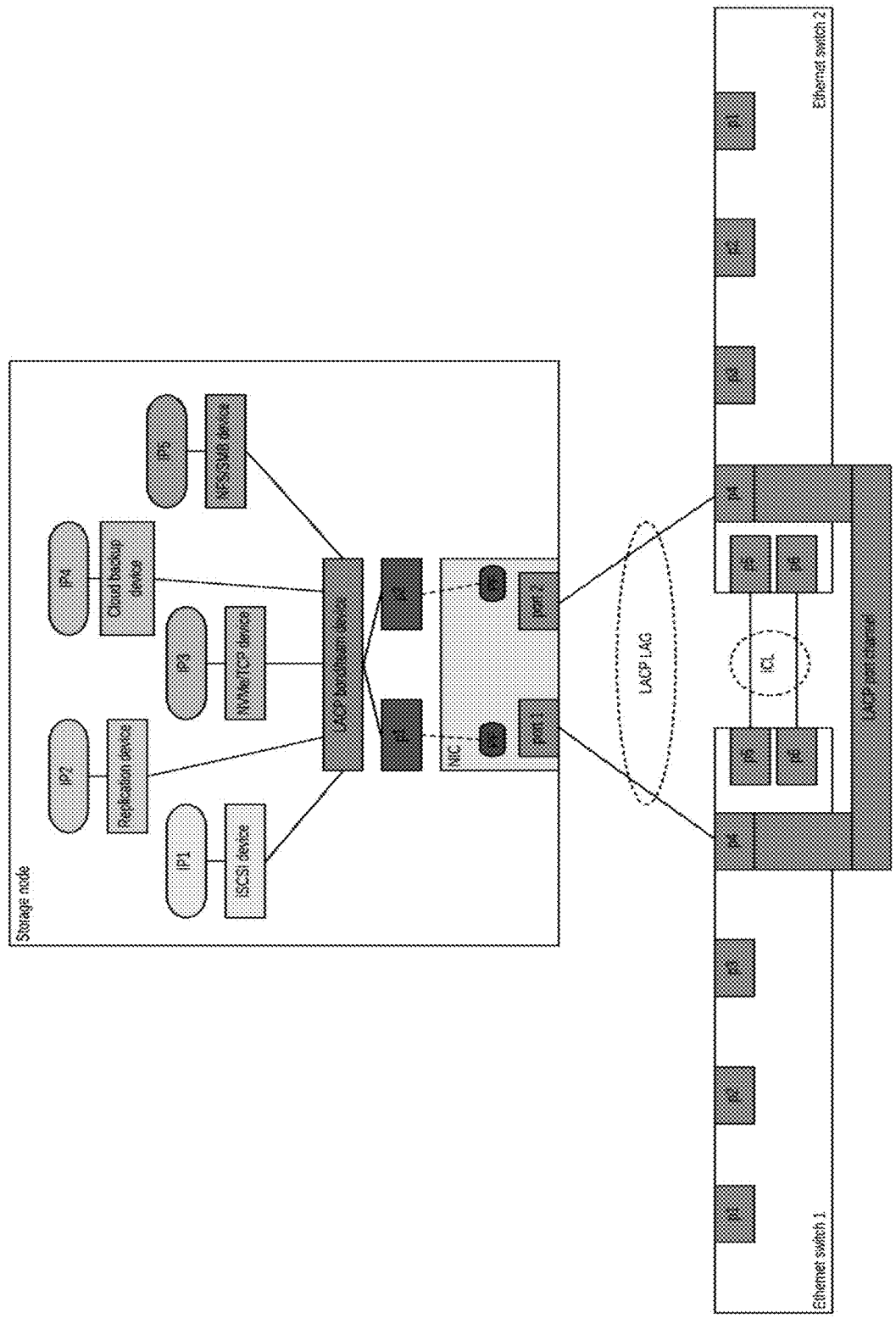
FIG. 5 is an example diagrammatic view of a multi-switch configuration according to one or more example implementations of the disclosure.

Referring to FIG. 5, there is shown an example multi-switch configuration 500 in order to protect against a failure of the Ethernet switch, where LACP allows multi-switch configuration when a port channel is stretched across multiple (usually two) switches. For this configuration to work, switches must support a variant of inter-chassis link (ICL, e.g., Dell VLTi, Cisco vPC, Arista MLAG, etc.) and must act as a single chassis from LACP standpoint. Generally, no changes on the storage system side are required for multi-chassis LACP.

Figure 6:
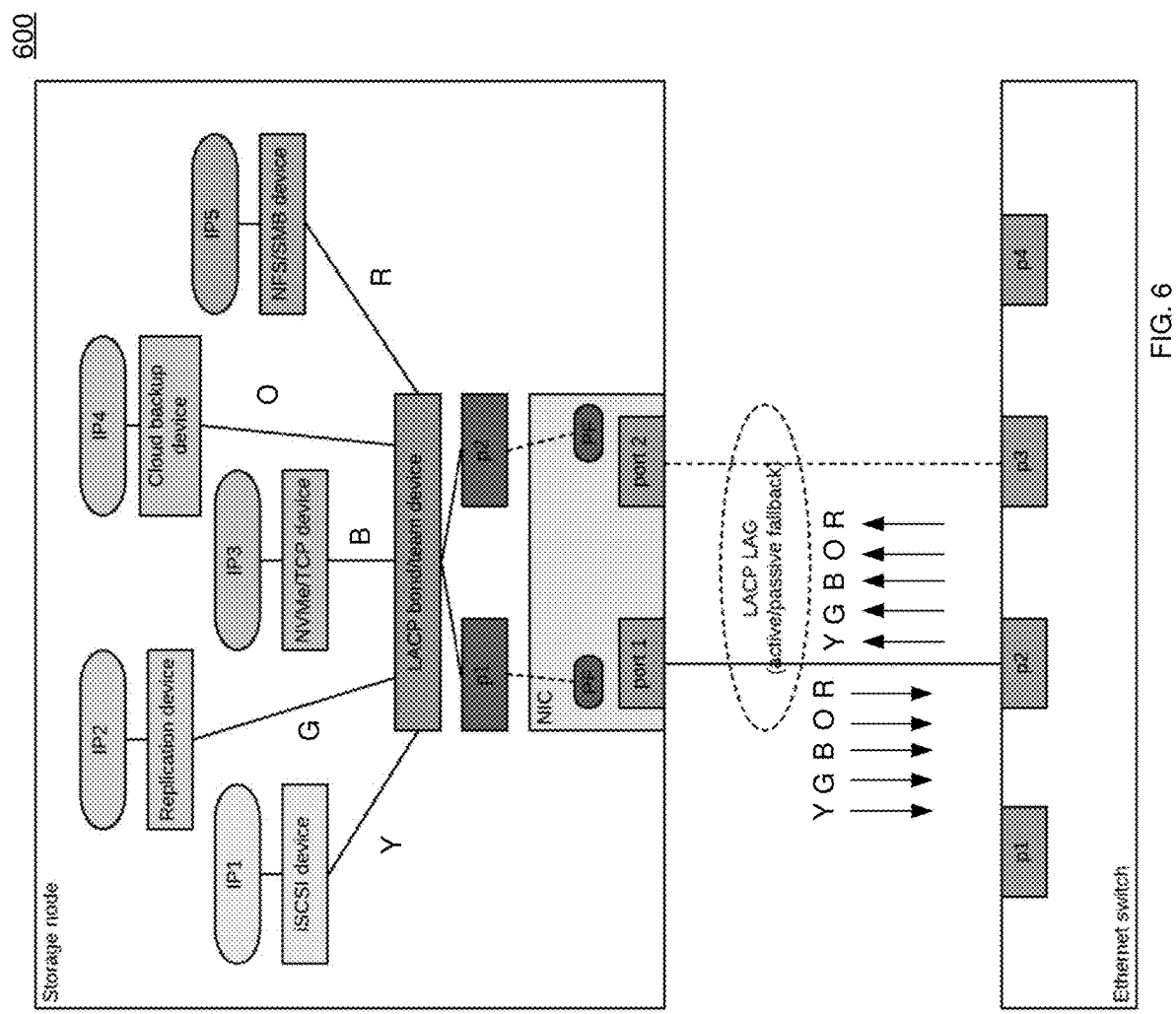
FIG. 6 is an example diagrammatic view of a switch configuration according to one or more example implementations of the disclosure.

Referring to FIG. 6, there is shown an example switch configuration 600. Production deployments of LACP are almost always multi-chassis because SPOFs are not typically acceptable. The approach disclosed in the present disclosure is agnostic to the LACP deployment variant. It works equally well for single switch and multi-switch deployments. In order to simplify the figures and disclosure, a single switch will be used going forward for ease of explanation.

Generally, if LACP is not configured on the Ethernet switch, then the LACP LAG automatically falls back to active/backup mode. In this mode, only 1/N of LAG bandwidth is available and both ends will transmit traffic via a single port. FIG. 6 shows this. Even if LACP is configured properly, in some edge cases all traffic may be sent over a single port. This happens because each end has an independent transmit hash function. This function takes an Ethernet frame as an input and produces the output interface as an output. Different functions are used in practice, including those which consider only L2 header, L2+L3 headers or even L2+L3+L4 headers (sometimes also looking at inner headers in encapsulated packets). Regardless of how complex the hash function is, it cannot guarantee that all traffic will not be sent to a single port because it must keep all frames of a single flow affined to the same port and data in the frame headers is not predictable. LACP does not typically support any kind of negotiation of the transmit hash functions between two ends, so the host may send the frames belonging to flow F1 via port P1, but the switch may send F1 frames via port P2.

Figure 7:
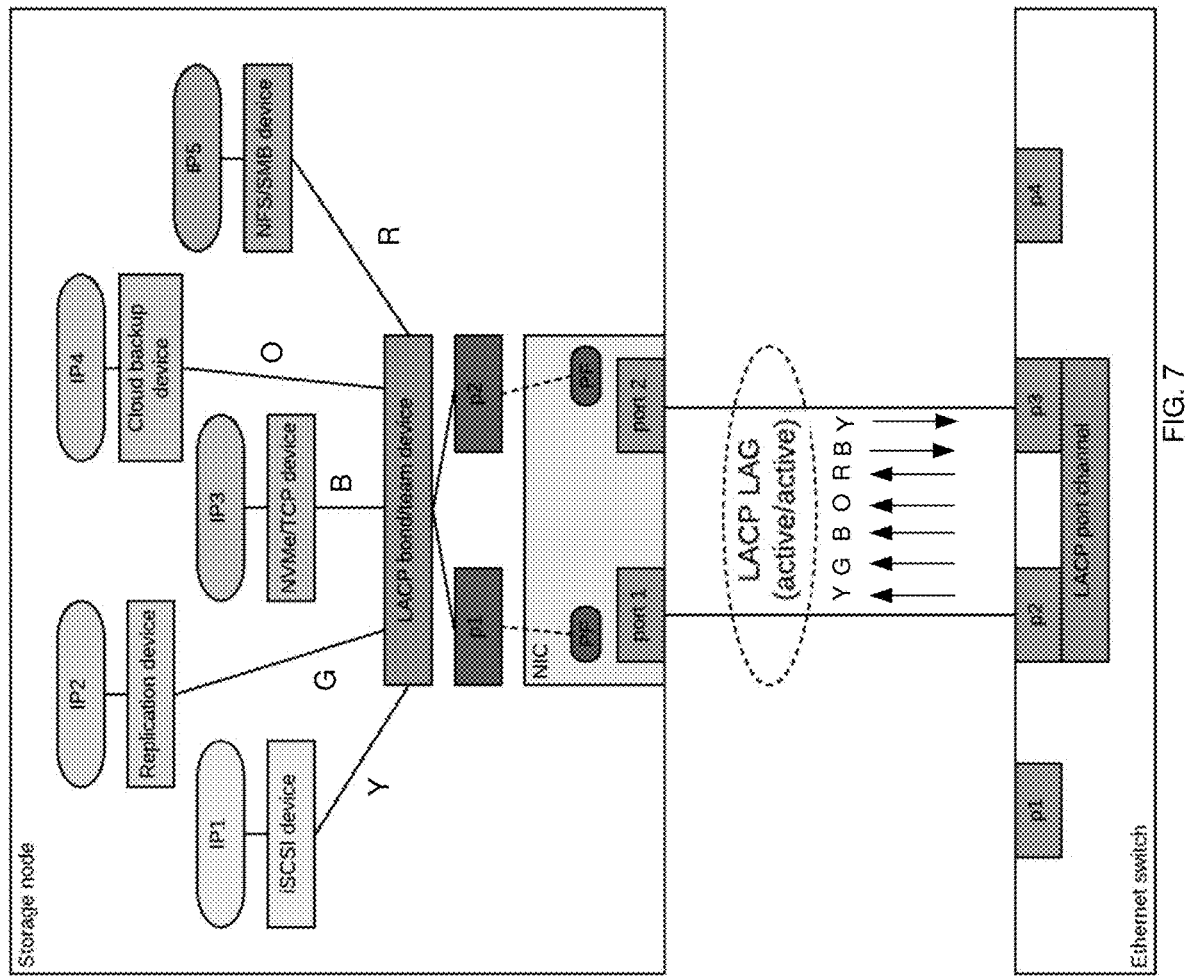
FIG. 7 is an example diagrammatic view of a port switch configuration according to one or more example implementations of the disclosure.

Referring to FIG. 7, there is shown an example port switch configuration 700, where it is demonstrated a "mathematically unlucky" switch port "p2" where switch's hash function directs all traffic for the storage system. The storage system is not able to change this behavior of the switch. Those two problems primarily cause issues for the protocols which could otherwise be configured on the independent ports and hence could consume all available bandwidth for both transmit and receive paths.

Figure 8:
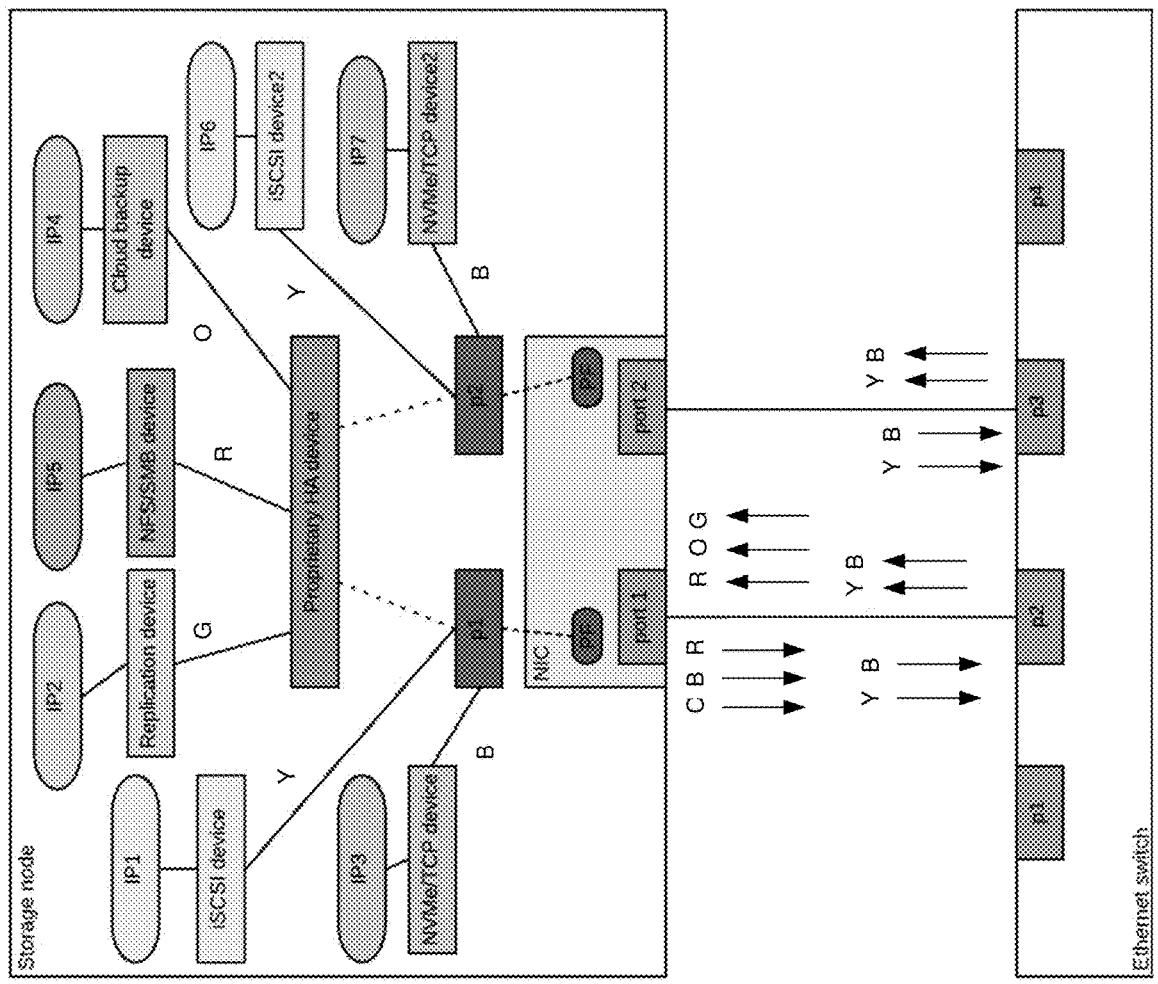
FIG. 8 is an example diagrammatic view of a port switch configuration according to one or more example implementations of the disclosure.
Figure 9:
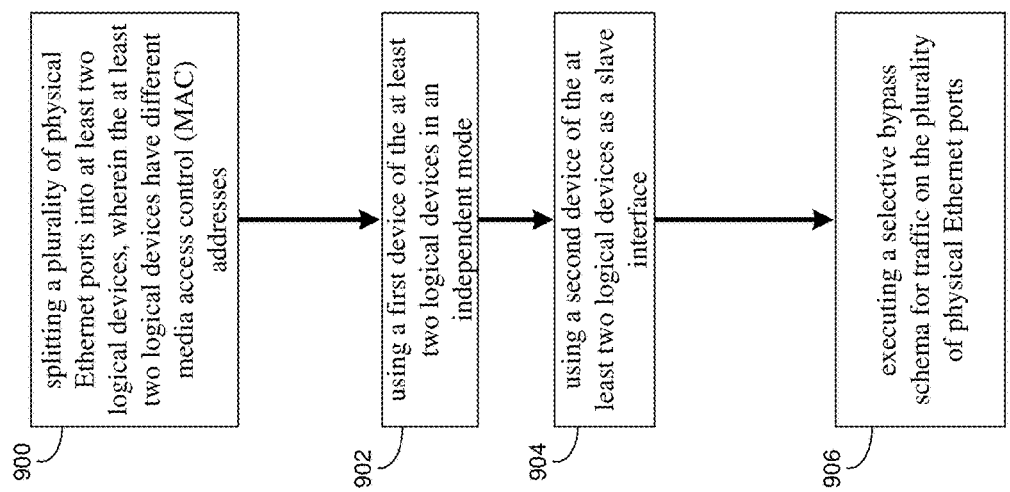
FIG. 9 is an example flowchart of a hybrid process according to one or more example implementations of the disclosure.

Referring to FIG. 8, there is shown an example port switch configuration 800. As was stated above, some traffic types natively support multi-pathing. For such traffic, a storage system may utilize physical Ethernet ports in independent mode and take advantage of MPIO for predictable bandwidth utilization. In such cases, LACP generally must not be configured on the Ethernet switch side and on the storage system side. The problem of such schemes, however, is that they may need to implement a proprietary HA scheme on top of independent ports. It may be relatively straightforward for active/passive design, but active/active may be hard to achieve for both transmit and receive paths. This leads to poor bandwidth utilization for traffic types without native multi-pathing support and additional development and maintenance cost.

Therefore, as will be discussed below, a new approach is disclosed that may be based on splitting the physical Ethernet ports into two operating system (OS) level logical devices with different MAC addresses. One such device may be used in independent mode and another one may be used as a slave interface of the LACP bond device. Such a scheme may provide a hybrid LACP bond which operates in LACP and independent modes for different clients and protocols. The hybrid LACP bond design based on port splitting and traffic redirection/mirroring may be implemented purely in software (but on a NIC) or with hardware assistance (e.g., SR-IOV splitting, eBPF/P4 offload for redirection/mirroring). The new approach may enable a selective LACP bypass scheme which allows supporting ROCE based traffic types and may guarantee full bandwidth utilization of hybrid bond members operating in independent mode. Moreover, the present disclosure may work for most (if not all) types of traffic (with/without native multi-pathing, RDMA and non-RDMA) and with most (if not all) types of Network Interface Cards (NICs).

The Hybrid Process:

As discussed above and referring also at least to the example implementations of FIGS. 9-16, hybrid process 10 may split 900, by a computing device, a plurality of physical Ethernet ports into at least two logical devices, wherein the at least two logical devices may have different media access control (MAC) addresses. Hybrid process 10 may use 902 a first device of the at least two logical devices in an independent mode. Hybrid process 10 may use 904 a second device of the at least two logical devices as a slave interface. Hybrid process 10 may execute 906 a selective bypass schema for traffic on the plurality of physical Ethernet ports.

In some implementations, hybrid process 10 may split 900, by a computing device, a plurality of physical Ethernet ports into at least two logical devices, wherein the at least two logical devices may have different media access control (MAC) addresses. For example, as will be discussed below, hybrid process 10 may split 900 the physical Ethernet ports into two OS level logical devices with different MAC addresses. In some implementations, hybrid process 10 may use 902 a first device of the at least two logical devices in an independent mode, and in some implementations, hybrid process 10 may use 904 a second device of the at least two logical devices as a slave interface. For instance, as will be discussed below, one such device may be used 902 in independent mode and another may be used 904 as a slave interface of the LACP bond device. Such a scheme may provide a hybrid LACP bond which operates in LACP and independent modes for different clients and protocols, and may be a hybrid LACP bond design based on port splitting and traffic redirection/mirroring implemented purely in software or with hardware assistance (SR-IOV splitting, eBPF/P4 offload for redirection/mirroring), and may enable a selective LACP bypass scheme which allows supporting ROCE based traffic types, to guarantee full bandwidth utilization of hybrid bond members operating in independent mode. Moreover, the present disclosure may work for most (if not all) types of traffic (with/without native multi-pathing, RDMA and non-RDMA) and with most (if not all) types of Network Interface Cards (NICs).

In some implementations, hybrid process 10 may one of mirror and redirect traffic on the plurality of physical Ethernet ports based upon, at least in part, a criteria of the traffic. For example, regardless of the chosen splitting option, it may be important to perform a redirection of some traffic to the virtual devices representing independent ports. That may be needed because the switch may send traffic directed to the MAC address of the independent virtual device behind physical port P2 via physical port P1. This may happen due to the nature of LACP transmit hash functions explained above. As such, hybrid process 10 may provide a correction of the switch decision and mirror or redirect traffic to the correct port.

Figure 10:
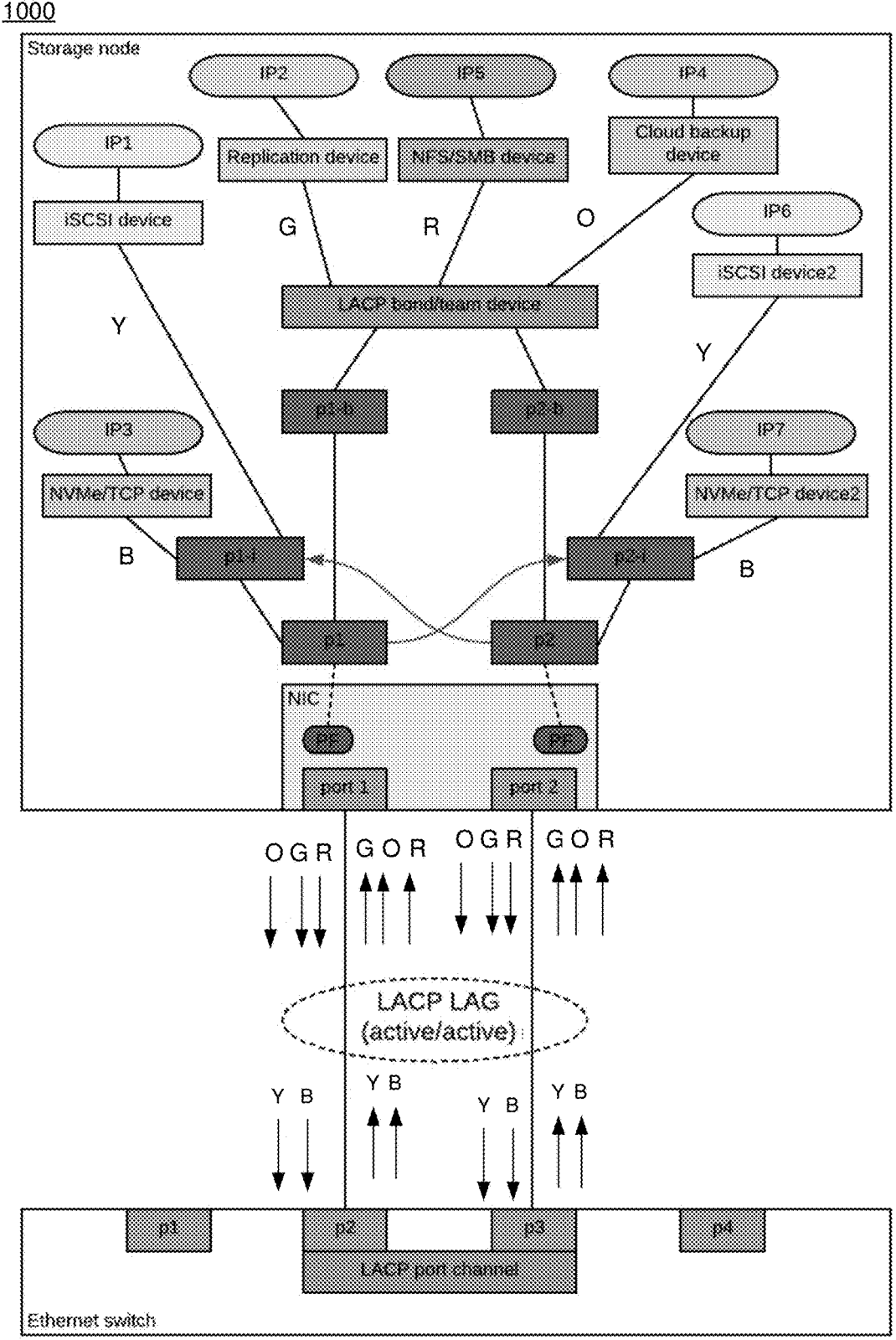
FIG. 10 is an example diagrammatic view of a LACP layout according to one or more example implementations of the disclosure.
Figure 11:
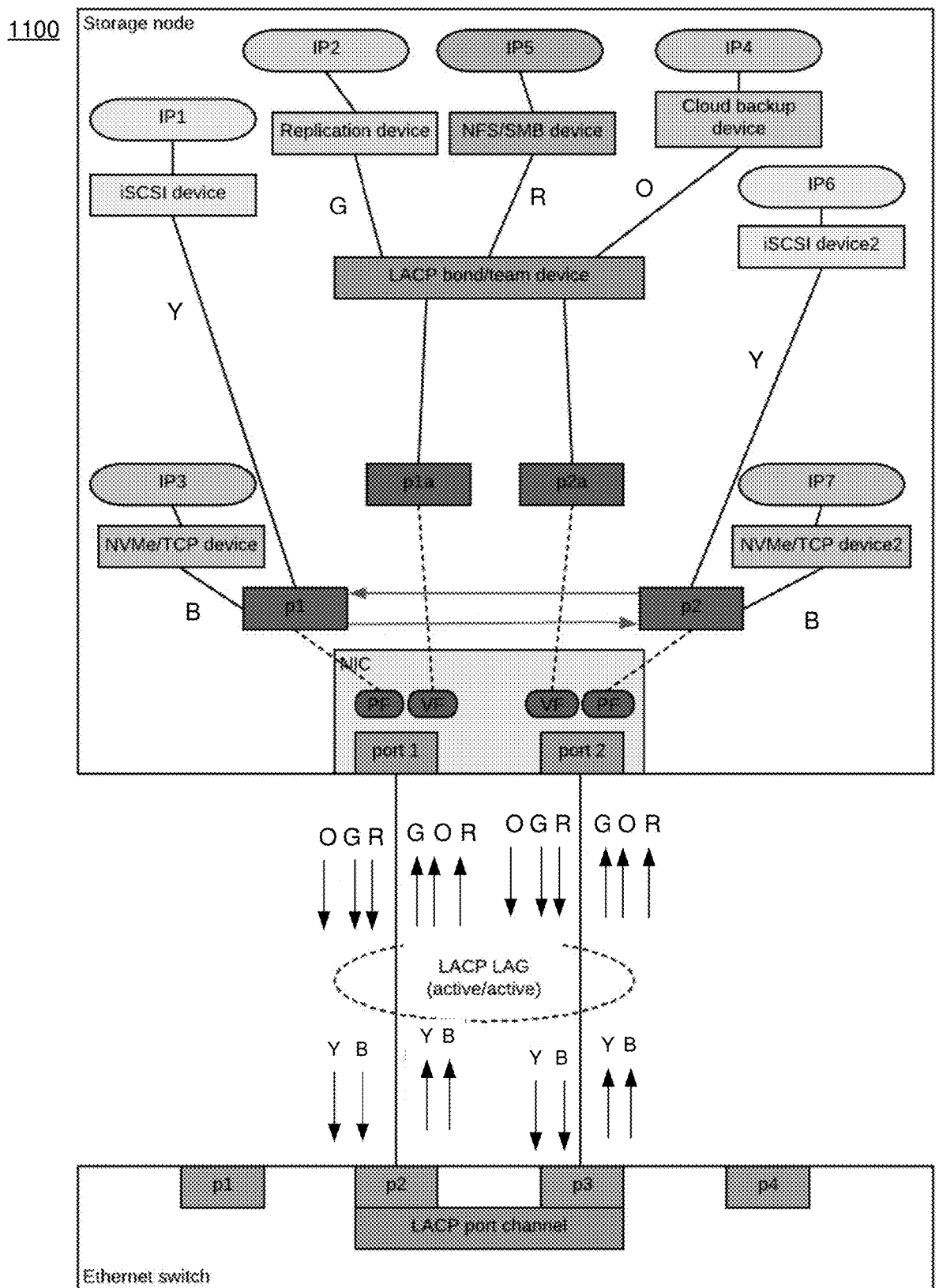
FIG. 11 is an example diagrammatic view of a LACP layout according to one or more example implementations of the disclosure.

Referring at least to the example implementation of FIG. 10, an example LACP layout 1000 is shown. In this figure, as well as some of the figures shown and discussed throughout with arrows, the arrows labeled "R" represent the redirect between devices performed on the storage controller node. Similarly, arrows are also labeled as "Y" "O," "G," and "B."

In some implementations, the splitting may be performed in a software-only design in one or more network interface cards. For instance, and still referring at least to FIG. 10, there are multiple ways to implement this in different operating systems and implementations depending on NIC capabilities as well. FIG. 10 demonstrates how this scheme may be implemented completely in software for any NIC (or ports from multiple independent NICs of different vendors if needed). In this scheme, hybrid process 10 may create two virtual devices on top of each virtual device representing a physical port. In some implementations, those two devices must have different MAC addresses, but one of them may share the MAC address with the parent device. The implementation of such a scheme depends on the OS. For example, on Linux it may be implemented via virtual MACVLAN device.

In some implementations, the splitting may be performed in hardware using a driver of one or more network interface cards (NICs). For instance, and referring at least to the example implementation of FIG. 11, there is shown another LACP layout 1100 option which takes advantage of single root input/output virtualization (SR-IOV) support in the NIC. In some implementations, the splitting may be performed in hardware and the driver of the NIC may expose two different virtual devices backed by PCIe physical function (PF) and virtual function (VF) respectively. Those devices may be guaranteed to have different MAC addresses and are used the same way as in the previous example. Note that depending on the NIC and OS, different interfaces may need to be chosen as an independent interface (e.g., either PF-backed or VF-backed). In some implementations, the splitting scheme of FIG. 11 may require only one additional MAC address per physical port. Note that virtual devices used for different types of traffic (upper devices) may share the same MAC address or use a different MAC address. Moreover, depending on the design of the storage system there may be a hierarchy of virtual devices (e.g., additional devices to implement VLAN tagging).

Figure 12:
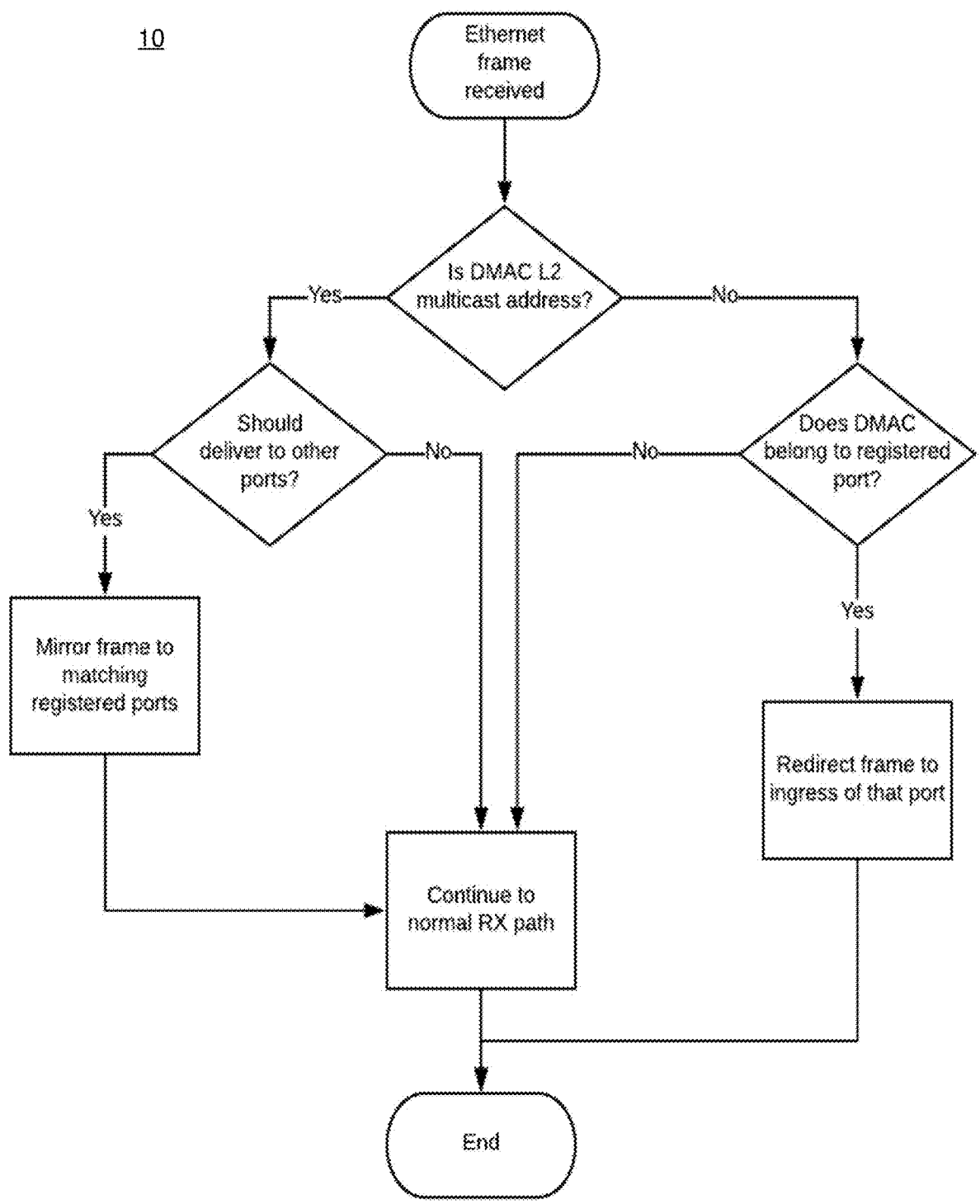
FIG. 12 is an example flowchart of a hybrid process according to one or more example implementations of the disclosure.
Figure 13:
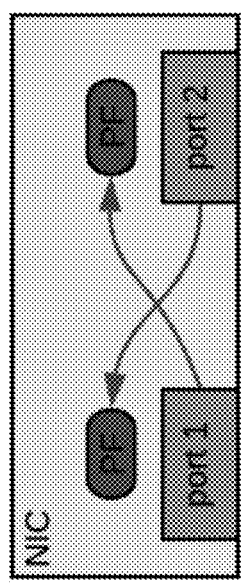
FIG. 13 is an example diagrammatic view of a NIC layout according to one or more example implementations of the disclosure.

As noted above, hybrid process 10 may one of mirror and redirect traffic on the plurality of physical Ethernet ports based upon, at least in part, a criteria of the traffic. In some implementations, the criteria may include whether the traffic is unicast, and in some implementations, the criteria may include whether the traffic is multicast. For instance, FIG. 12 shows an example flowchart of hybrid process 10 that may describe the redirection. The LACP transmit hash function on the switch side may work the same way for unicast and multicast frames. This means that multicast frames are not sent via all ports, but instead only one port is selected for a transmission of any multicast frame according to the hash function result.

If the frame received from the physical port is multicast, then hybrid process 10 may first make a decision whether to mirror it to other devices configured in independent mode. This decision may be storage system specific, but usually the following example scheme may be used: (1) if the frame is tagged with IEEE 802.1q VLAN tag and VLAN ID is not set on the device configured in independent mode, then do not mirror the frame; (2) if the frame type does not belong to a set of predefined protocols (usually ARP, IPv4 and IPv6), then do not mirror the frame. This allows avoiding mirroring of frames belonging to link layer protocols such as STP, CDP, LLDP, LACP and others which in most cases will be dropped on the destination device anyway. In case the destination device is interested in such protocols, it may specify this interest explicitly and the process will mirror the frame; (3) all other frames are mirrored.

If the frame received from the physical port is unicast, then a hash lookup of the frame's destination MAC address may be performed by hybrid process 10 and if it belongs to one of the virtual devices configured in independent mode, then it is redirected (not mirrored) to the ingress of that virtual device. Otherwise, the frame is delivered normally. Note that in some implementations there may be multiple MACs behind the independent virtual device.

Regarding the above-noted redirect/mirroring, this may be done in a software implementation. For instance, the redirect implementations may vary depending on the OS and capabilities of the NIC. The most straightforward way to perform the redirect is via a software implementation. For example, on Linux it may be possible to implement the entire redirect logic in an eBPF program (e.g., via hybrid process 10) attached to the ingress path of the virtual device representing the physical port. The storage system control plane (e.g., via hybrid process 10) may configure eBPF maps with the MAC addresses of all independent ports and the eBPF program (e.g., via hybrid process 10) may perform redirect via bpf_redirect( ) helper and mirroring via bpf_clone_redirect( ) helper. A possible example advantage of this implementation is that no changes in the OS networking stack may be needed and the scheme may be dynamic and fully programmable. Another option on Linux is kernel TC framework of classifiers and "mirred" action.

Regarding the above-noted redirect/mirroring, this may be done in a hardware implementation. For example, and referring at least to the example implementation of FIG. 13, an example NIC layout 1300 is shown. In the example, some NICs may support programmable packet processing offloads such as eBPF or P4. For such NICs, it may be possible to offload the redirect logic completely to the NIC hardware (e.g., via hybrid process 10). This scheme may provide better performance and easier storage system design because the OS may always receive traffic from the correct port. Depending on the NIC hardware, this scheme may also allow RDMA based protocols like NVMe/ROCEv2 to work properly when configured on top of independent devices. In some implementations, a possible example downside of this scheme may be that unlike the above-noted software implementation, the NIC will not be able to redirect or mirror traffic to the port of another NIC, i.e., the scheme may be limited to LACP bond over the ports of the same NIC.

In some implementations, because LACP on the switch side may pick the wrong port for transmission and LACP bond on the storage system side does not control the independent virtual devices, additional NIC (receive path) configuration may be needed. In some implementations, one or more filters may be synchronized between the at least two logical devices, and in some implementations, one or more filters may be synchronized between the plurality of physical Ethernet ports. For example, hybrid process 10 may need to synchronize unicast and multicast filters between the independent virtual devices and push them down to all physical ports so that the NIC does not drop the frames in hardware. Hybrid process 10 may, if different IEEE 802.1q VLAN IDs are used on the independent ports, synchronize VLAN filters on the physical ports. Otherwise, the NIC may drop the frame tagged with unknown VLAN ID due to hardware VLAN filtering.

The implementation of the above requirements may depend on the OS. On Linux, for example, both may be implemented by creating a MACVLAN virtual device (or similar) with manually assigned MAC and configuring necessary VLAN devices (or similar) on top of it. Those virtual devices may also be hidden in a separate network namespace so that the rest of the storage system stack is not aware that they even exist. In case of the hardware-offloaded redirect/mirroring implementations, the steps above may not be needed depending on the NIC design.

Example and non-limiting advantageous of the above may include, e.g., (1) the hybrid LACP bond allows to use ports in independent mode and LACP mode at the same time, (2) it may be possible to always utilize all available bandwidth for independent ports (transmit path), (3) the solution may work for any LACP configuration on the Ethernet switch side. If LACP is not configured, then protocols in LACP mode will have 1/N of available bandwidth as expected. If LACP is configured, then the LAG is active/active and may allow clients to utilize all available bandwidth with enough number of flows. If LACP is not enabled, then receive path for the ports in independent mode is predictable, (4) the hybrid bond may leverage the OS LACP implementation and hence does not require development of a proprietary HA scheme, (5) the configuration of the Ethernet switch is fully decoupled from the configuration of the storage system. This means that storage and network admins may independently configure their systems and no coordination is required. If network admin enables LACP port-channel, then the storage system may automatically take advantage of extra bandwidth. If LACP port-channel is removed or ports are changed, then the storage system may automatically fallback to active/passive mode, (6) ROCE traffic in ROCE LAG mode may work as expected with hybrid LACP bond design, and (7) ROCE traffic for the independent ports may work in case of hardware-offloaded redirect/mirroring (depends on RNIC implementation).

In some implementations, hybrid process 10 may execute 906 a selective LACP bypass schema for traffic on the plurality of physical Ethernet ports. For example, regarding selective LACP bypass, the following may be intended to solve at least two remaining problems. One problem being that ROCE traffic in independent mode is not going to work for software implementation of hybrid bond on most RNICs. That may be because redirection/mirroring happens in software, but ROCE traffic is handled in RNIC hardware. The other is that if LACP is configured on the Ethernet switch side, then it is possible that the traffic will be sent via a single port according to LACP transmit hash function behavior thus leading to suboptimal receive path behavior on the storage system from a performance standpoint. Both problems may be caused by the standard LACP transmit hash function behavior which is not aware of two different modes of ports operation on the storage system side with hybrid bond, i.e., LACP and independent modes. In other words, the switch may send frames to the wrong port reducing L2 traffic bandwidth and breaking ROCE-based protocols such as NVMe/ROCEv2 configured on top of independent ports. As such, hybrid process 10 may enhance the operation of LACP transmit path so that frames directed to certain MAC addresses associated with physical port P could be sent directly to that port P completely bypassing LACP transmit hash function based destination port selection. Therefore, hybrid process 10 may implement a mechanism and protocol of exchanging necessary information between the storage system and the Ethernet switch, and may propose changes in the LACP transmit path behavior.

Figure 14:
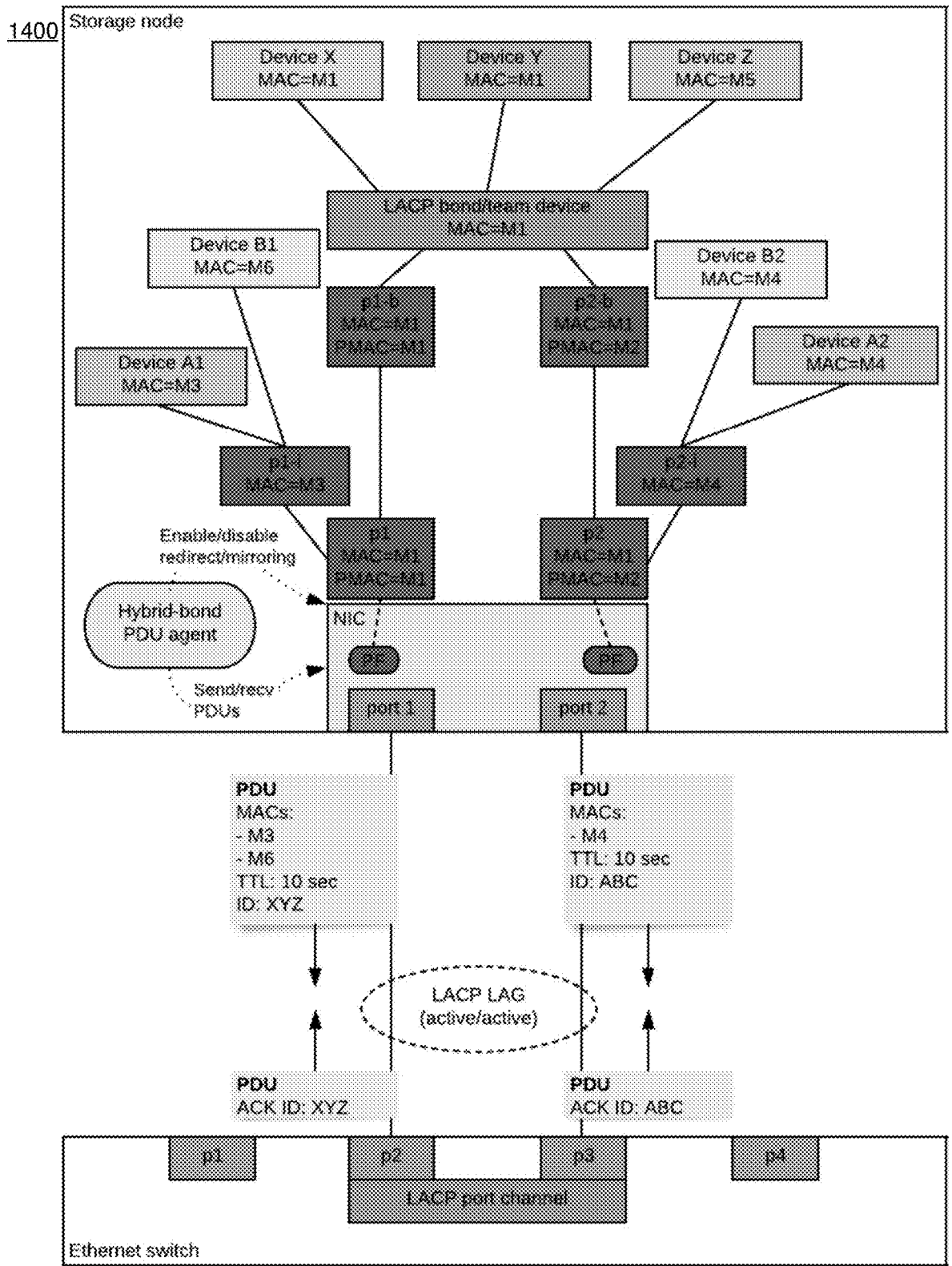
FIG. 14 is an example diagrammatic view of a LACP layout according to one or more example implementations of the disclosure.
Figure 15:
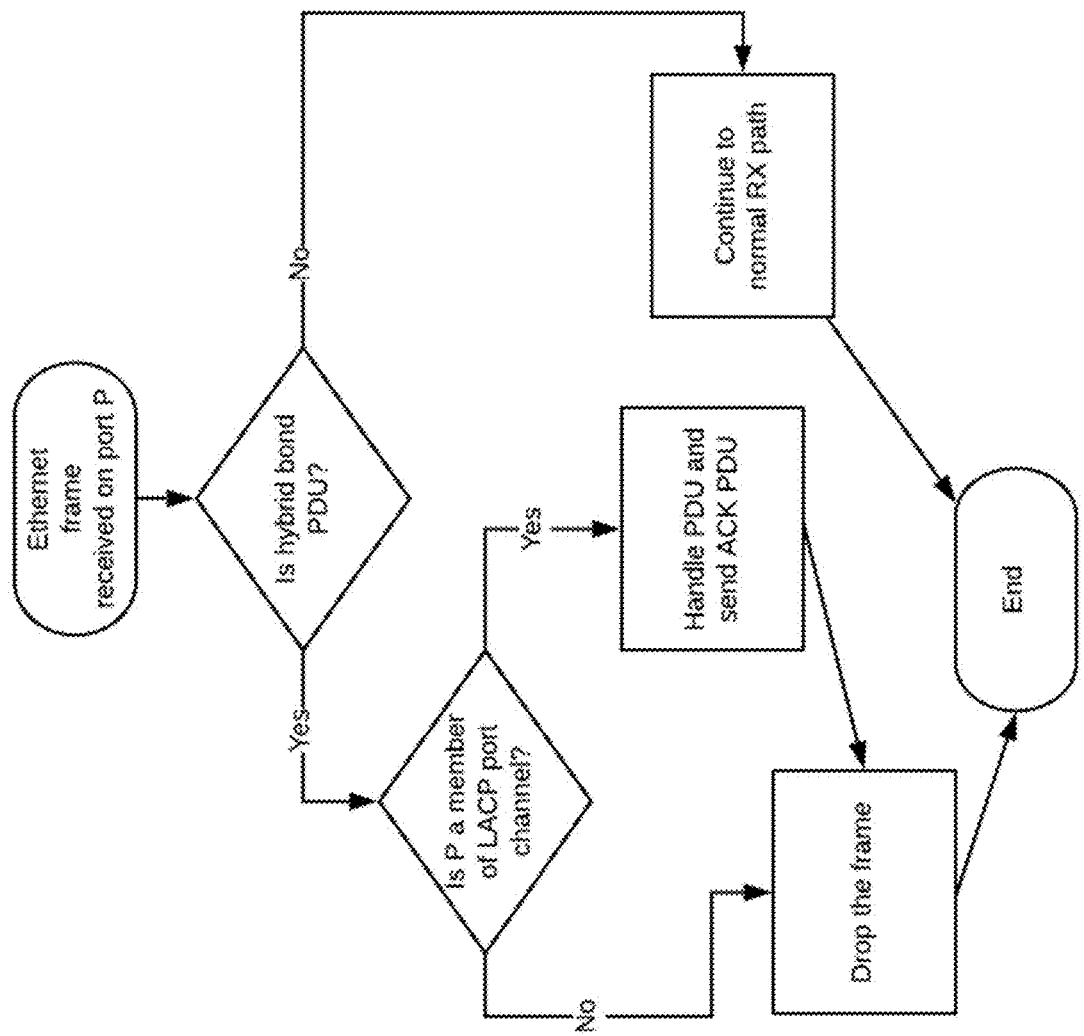
FIG. 15 is an example flowchart of a hybrid process according to one or more example implementations of the disclosure.

For example, and referring at least to the example implementation of FIG. 14, an example LACP layout 1400 is shown. As seen in FIG. 14, there is shown a possible storage system implementation with hybrid LACP bond introduced above. There are multiple virtual network devices configured on top of the LACP bond device and on top of independent virtual devices. It may be important that splitter devices configured on top of the same physical port have different MAC addresses. Devices configured on top of independent ports or on top of the bond may have either the same MAC as parent device (e.g., Device A1) or different MAC (e.g., Device Z).

The storage node supporting the hybrid bond should send L2 PDUs to the Ethernet switch via each physical port enslaved to the hybrid bond. Those PDUs should be sent periodically every N seconds and should include the list of MAC addresses configured behind the port in the independent mode (including the MAC of the independent virtual device itself). The PDUs should also include the TTL which should be greater than the transmission interval N and ID of the PDU which should be unique for each PDU sent to the particular port. In some implementations, a hybrid bond agent (e.g., via hybrid process 10) running on the storage system may take care of transmission of such PDUs.

In addition to sending the PDUs periodically, the hybrid bond agent (which may be part of hybrid process 10) should also send them immediately in case the virtual device is brought up or the link is detected (e.g., after plugging in a cable). The timer should be restarted in case of such out-of-order transmission of the PDU. Those PDUs are supposed to tell the switch that a frame with destination MAC M, if found in one of the lists of advertised MACs, should be sent directly to the corresponding port bypassing LACP transmit hash function based port selection. If the switch supports reception of such PDUs, it may be expected that it will send an acknowledgement PDU for each received PDU. That ACK PDU should include the ID of the PDU it is acknowledging. The agent on the storage node is supposed to receive all such ACK PDUs from the switch. If the ACK PDUs are received for the hybrid bond slave interfaces, it should disable the redirect and mirroring logic in software or in hardware. If the ACK PDUs are not received at least on one enslaved port (which should be healthy), then the redirect and mirroring logic should be enabled again. Note that arrows labeled with "R" in FIG. 14 are not shown to demonstrate that redirect logic is disabled because the switch sends the ACK PDUs. The agent should never forward the ACK PDUs received from the switch.

In some implementations, the switch should receive the PDUs sent by the storage node and track them per port in the internal storage. The PDUs should never be forwarded. If the PDU is received for the port which is not a member of LACP port channel, it should be dropped immediately without any further actions. Upon reception of the valid PDU, the switch should immediately acknowledge it with ACK PDU with the ID copied from the received PDU. This may be shown in the example implementation of FIG. 15, where a flowchart of this implementation may be executed by hybrid process 10.

Figure 16:
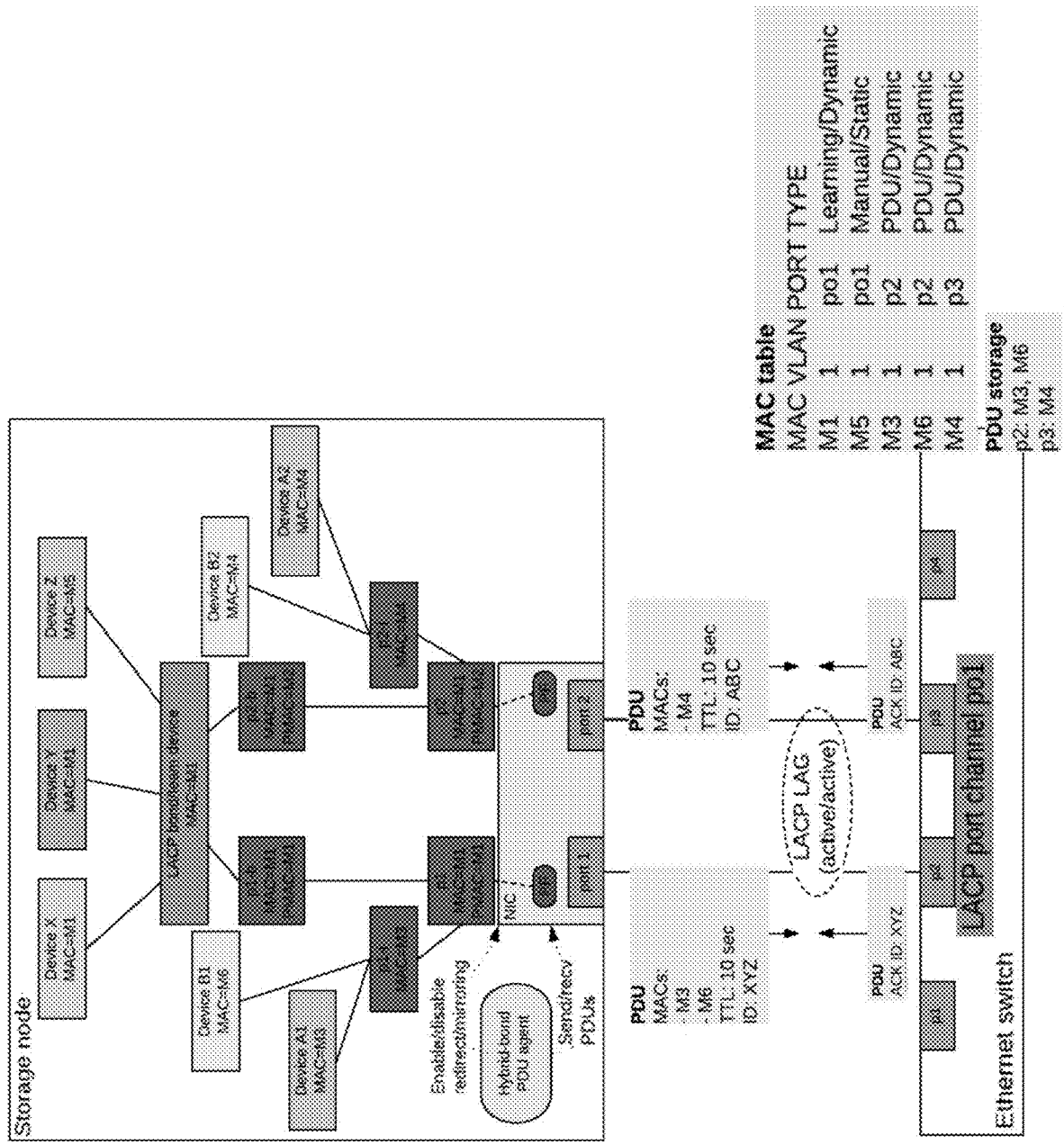
FIG. 16 is an example diagrammatic view of a LACP layout according to one or more example implementations of the disclosure.

Referring at least to the example implementation of FIG. 16, and example LACP layout 1600 is shown. In the example, the switch should keep track of TTL for the MAC addresses received in the PDUs for each port. The switch should remove the entries from the internal storage in the following three example cases: (1) if TTL has expired for any reason (e.g., host stopped sending PDUs, cable was unplugged, port was shut down, etc.), (2) if the port is removed from the LACP port channel or port channel itself is removed, (3) if the MAC address was advertised in the PDU received from a different port (e.g., cable was re-plugged or storage system was reconfigured). When the switch needs to forward an Ethernet frame, it usually contacts the MAC table. The MAC table may consist of dynamically learnt entries or static entries added by an administrator manually. One possible implementation is to add the MAC addresses received from PDUs (and stored in the internal storage) to the MAC table. Another possible implementation is to store them directly in the MAC table storage. The implementation should be defined by the design of the specific Ethernet switch.

In both cases, the MAC table may have entries populated from PDU data. Those entries may be assigned a distinct type saying that those entries are obtained from PDUs as opposed to the normal learning or manual insertion. The host may optionally send the VLAN ID for each advertised MAC in the PDU and in this case the switch should use this information. If that information is missing, then it should use the list of allowed VLANs and a native VLAN configured on the port channel. In case the switch needs to forward the broadcast frame (or multicast frame without specific membership information) within some VLAN and this VLAN is allowed on the port channel, then the switch should send the frame to each port of the port channel if PDUs were received for those ports. If PDUs were not received, then the frame should be forwarded to the port channel and LACP transmit hash function should select the outgoing port. For the unicast frames, the switch should look at the destination MAC address and if that MAC is found in the MAC table and entry has PDU/Dynamic type, then the frame should be sent directly to the port (a member of the port channel). Otherwise, LACP transmit hash function should select the outgoing port.

In some implementations, there may be protocols to consider. For instance, there are multiple implementation options for the protocol between the storage system and the switch. The protocol should work at layer 2 and its semantics is strictly peer-to-peer (i.e., frames should never be forwarded). It may be possible to develop a proprietary protocol or extend LACP protocol with new types of PDUs. However, the present disclosure proposes to use IEEE LLDP protocol at least because, e.g.: (1) it is a standard protocol, (2) virtually all operating systems and Ethernet switches support LLDP, (3) it is extensible and allows adding new TLVs as well as organization-specific TLVs, (4) LLDP standard already mandates that LLDP PDUs must never be forwarded, (5) LLDP already has built-in TTL support.

In some implementation, hybrid process 10 may encode hybrid bond PDUs into LLDP organization-specific TLVs. For instance, if the switch does not support selective LACP bypass, it may just ignore unknown TLVs in LLDP PDU. If it supports selective LACP bypass as described throughout, it should look into the LLDP PDU and search for hybrid bond TLVs. If found, the switch should populate the internal storage as described above and send the ACK PDU encoded as LLDP PDU. The implementation may rely on LLDP TTL or define per-MAC TTL if desired.

In some implementations, the switches are optimized to forward the frames very fast and their forwarding tables are very efficient. The majority of switches also support static MAC table entries which could be inserted by the administrator. In some implementations, hybrid process 10 may align with the design of the forwarding tables and does not require significant changes on the switch side. Only a new type of MAC table entry may be needed. On some switches, it should be possible to store data received from the PDUs directly in the MAC table. On other switches, a dedicated storage may be needed. The entry in the MAC table may be associated directly with the port-channel member. In this case, the forwarding should work as usually. Alternatively, it may be associated with the port channel itself. In this case, the dispatch between LACP hash based port selection and PDU based port selection should be done in LACP data path.

The present disclosure may be compatible with multi-chassis LAG configurations. If the PDU is received on the switch SW1, then all internal tables should be synchronized with the peer switch SW2. On the SW2, the MAC table entries propagated from SW1 should be associated with ICL port channel.

In some implementations, there may be example and non-limiting advantages of selective LACP bypass. For instance, when the selective LACP bypass mode is enabled on the switch, it may always send the frames directed for MAC addresses behind the virtual device in independent mode via the correct port. This completely removes the potential bandwidth bottleneck in the receive path for the protocols configured in independent mode. This may also make it possible to use ROCE based protocols such as NVMe/ROCEv2 in independent mode. The storage system may decide whether it wants to use independent mode or ROCE LAG. This is very useful for scenarios when ROCE LAG is not available due to hardware limitations (e.g., LACP LAG is created across two different NICs). Finally, because the switch no longer uses LACP transmit hash function for the traffic directed to independent ports, there is no need to perform the software or hardware-assisted redirection or mirroring of the traffic which leads to less overhead. Advantageously, the present disclosure may be aligned with the design and features of Ethernet switches to use existing protocols for data exchange which makes it possible to implement selective LACP bypass without re-architecture of switch hardware and NOS.

It may be worth noting that the present disclosure may be fully compatible with LACP LAGs containing more than 2 ports and LACP LAGs between two switches or between two hosts. Notably, the present disclosure is not restricted to the storage systems use-case described throughout and may be used in other domains as well.

It will be appreciated that the present disclosure may have one or more example and non-limiting advantages, such as, e.g.: (1) protocols with native multi-pathing support such as iSCSI do not need to pay penalty of the reduced bandwidth in case LACP is not configured on the switch side. This approach allows to use ports of LACP LAG in independent mode for such protocols and still leverage LACP for other protocols without native multi-pathing support. Moreover, this mechanism even supports both independent and LACP mode for the same protocol simultaneously if required by a specific use-case, (2) for the protocols without native multi-pathing support or protocols with such support disabled in a particular storage system implementation (e.g., to reduce the number of required IP addresses), this approach may provide at least network-level HA support. The approach does not strictly require LACP and ICL configuration on the physical switch side. If not configured, such protocols may be accessible, but the bandwidth may be limited to a single port (active/passive mode). If LACP is configured on the switch side, however, this approach may fully automatically switch to the active/active mode leveraging LACP protocol, (3) switch-side LACP configurations may be enabled or disabled at any moment without impact to the storage system (except expected bandwidth reduction in active/passive mode for protocols using LACP LAG, but not protocols using ports in independent mode). This may allow storage and network administrators to perform configuration and reconfiguration fully independently without complex coordination of efforts thus reducing OPEX, (4) the networking and frontend subsystems of the storage system do not have to support two distinct modes for LACP LAG and independent ports. The same network model may cover both use-cases at the same time and there is no need to implement complex transitioning between them, (5) there is no need to develop and maintain a proprietary HA mechanism which may be especially hard if active/active mode is desired. The present disclosure may use industry standard LACP protocol and allows to fully reuse the LACP implementation on many operating systems, (6) The present disclosure may be implemented purely in software for/on basic NICs or offloaded to hardware for more advanced NICs, (7) for protocols with native multi-pathing support configured on independent ports which belong to LACP LAG, the switch may always (or almost always) transmit the traffic to the right port. For non-RDMA protocols, this means that switch side LACP distribution hash function no longer penalizes a single port introducing a bottleneck in the I/O path. This also means that LACP distribution hash function no longer sends the traffic to the wrong port which allows to fully eliminate the need to redirect the traffic between ports on the storage system side, (8) it becomes possible to use RDMA based protocols in independent mode even if LACP LAG is configured on the switch side. No changes are required in the existing RNICs for this to work. Moreover, LACP LAG may be configured on the ports which do not support ROCE LAG due to RNIC hardware limitations (ROCE and L2 traffic will work for independent ports and L2 traffic will work for LACP LAG), (9) implementation of the LACP enhancement does not require big changes on the switches and control plane protocol may be implemented as a simple extension of existing industry-standard in-band protocols such as LLDP. The communication between the storage system and the physical switch may be fully automatic, in-band and transparent for the users, (10) the solution does not require any changes to the LACP or other standards and may work for both standard and multi-chassis LACP deployments, (11) the present disclosure may be compatible with RDMA-based protocols such as NVMe/ROCEv2 and supports both ROCE LAG and independent ROCE mode.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    splitting, by a computing device, a plurality of physical Ethernet ports into at least two logical devices, wherein the at least two logical devices have different media access control (MAC) addresses;
    using a first device of the at least two logical devices in an independent mode;
    using a second device of the at least two logical devices as a slave interface in a Link Aggregation Control Protocol (LACP) mode; and
    executing a selective bypass schema for traffic on the plurality of physical Ethernet ports, wherein the plurality of physical Ethernet ports is used in the independent mode and the LACP mode at the same time.

2. The computer-implemented method of claim 1 wherein the traffic is unicast.

3. The computer-implemented method of claim 1 wherein the traffic is multicast.

4. The computer-implemented method of claim 1 wherein the splitting is performed in a software-only design in one or more network interface cards.

5. The computer-implemented method of claim 1 wherein the splitting is performed in hardware using a driver of one or more network interface cards.

6. The computer-implemented method of claim 1 wherein one or more filters are synchronized between the at least two logical devices.

7. The computer-implemented method of claim 1 wherein one or more filters are synchronized between the plurality of physical Ethernet ports.

8. A computer program product residing on a non-transitory computer readable storage medium having a plurality of instructions stored thereon which, when executed across one or more processors, causes at least a portion of the one or more processors to perform operations comprising:
    splitting a plurality of physical Ethernet ports into at least two logical devices, wherein the at least two logical devices have different media access control (MAC) addresses;
    using a first device of the at least two logical devices in an independent mode;
    using a second device of the at least two logical devices as a slave interface in a Link Aggregation Control Protocol (LACP) mode; and
    executing a selective bypass schema for traffic on the plurality of physical Ethernet ports, wherein the plurality of physical Ethernet ports is used in the independent mode and the LACP mode at the same time.

9. The computer program product of claim 8 wherein the traffic is unicast.

10. The computer program product of claim 8 wherein the traffic is multicast.

11. The computer program product of claim 8 wherein the splitting is performed in a software-only design in one or more network interface cards.

12. The computer program product of claim 8 wherein the splitting is performed in hardware using a driver of one or more network interface cards.

13. The computer program product of claim 8 wherein one or more filters are synchronized between the at least two logical devices.

14. The computer program product of claim 8 wherein one or more filters are synchronized between the plurality of physical Ethernet ports.

15. A computing system including one or more processors and one or more memories configured to perform operations comprising:
    splitting a plurality of physical Ethernet ports into at least two logical devices, wherein the at least two logical devices have different media access control (MAC) addresses;
    using a first device of the at least two logical devices in an independent mode;
    using a second device of the at least two logical devices as a slave interface in a Link Aggregation Control Protocol (LACP) mode; and
    executing a selective bypass schema for traffic on the plurality of physical Ethernet ports, wherein the plurality of physical Ethernet ports is used in the independent mode and the LACP mode at the same time.

16. The computing system of claim 15 wherein the traffic is one of unicast and multicast.

17. The computing system of claim 15 wherein the splitting is performed in a software-only design in one or more network interface cards.

18. The computing system of claim 15 wherein the splitting is performed in hardware using a driver of one or more network interface cards.

19. The computing system of claim 15 wherein one or more filters are synchronized between the at least two logical devices.

20. The computing system of claim 15 wherein one or more filters are synchronized between the plurality of physical Ethernet ports.

* * * * *